May 19, 1925.
P. J. LUCICH
1,537,953
CABLE SAW FOR TREES
Filed Nov. 30, 1923
3 Sheets-Sheet 1
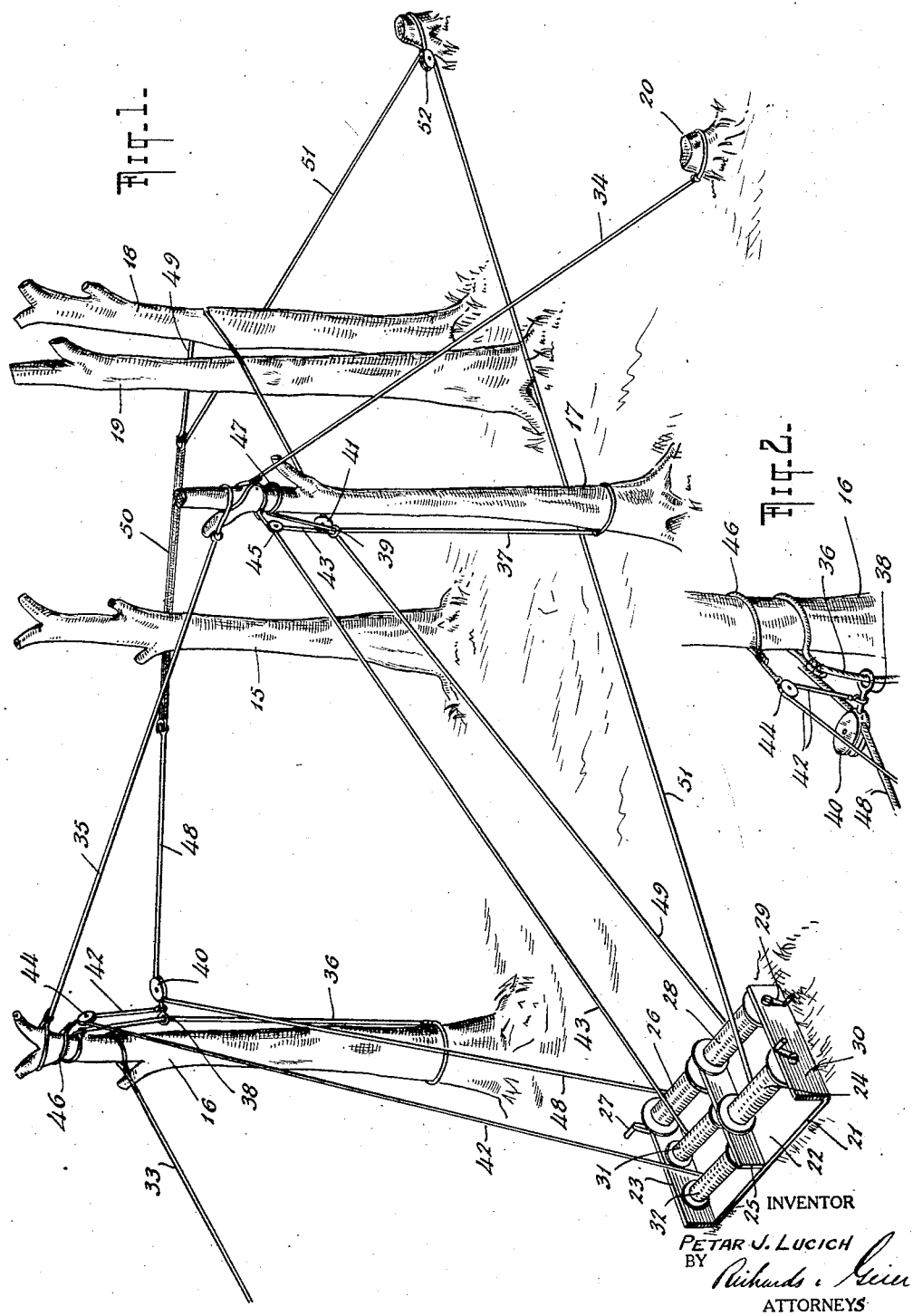
INVENTOR
PETAR J. LUCICH
BY
ATTORNEYS

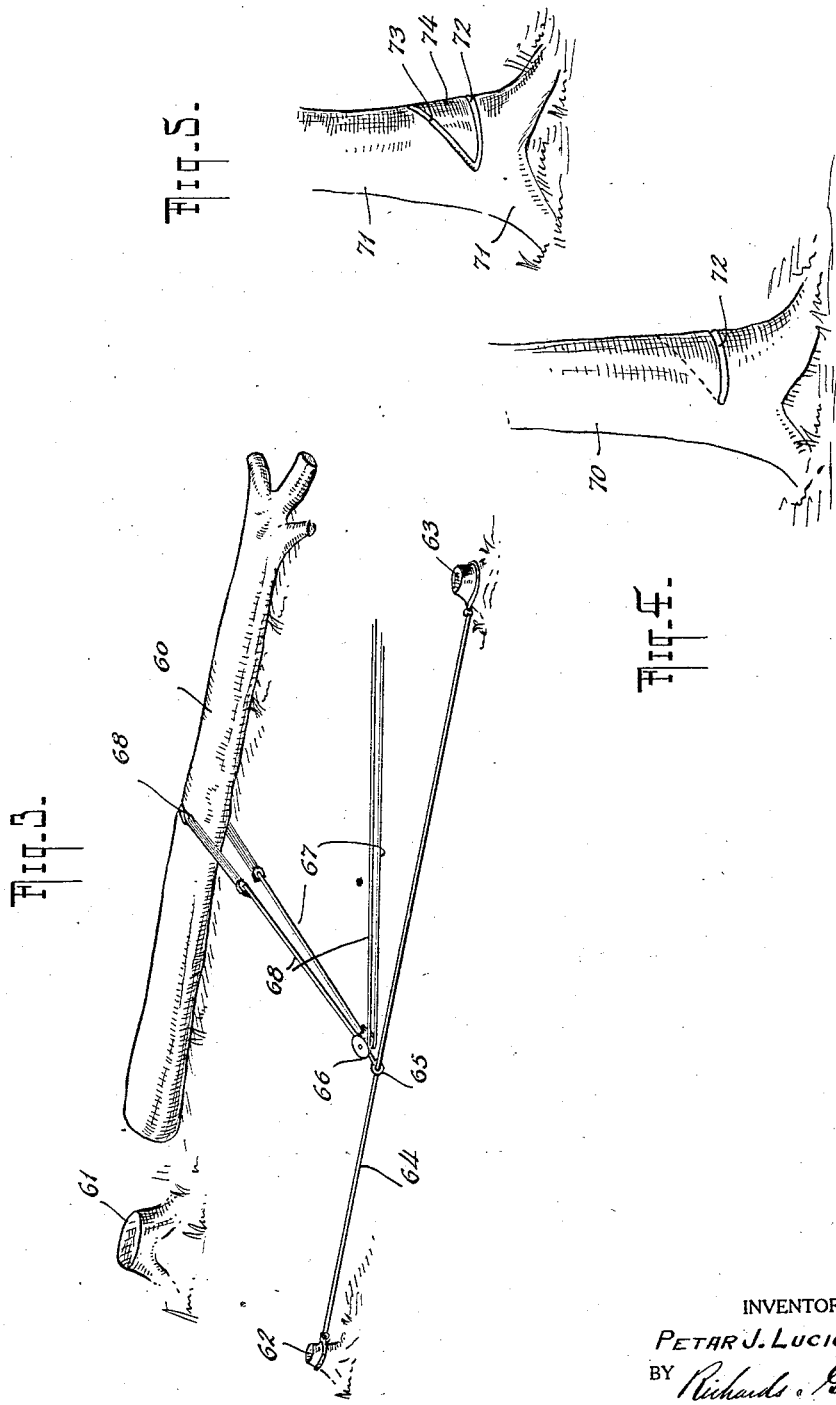

May 19, 1925.
P. J. LUCICH
CABLE SAW FOR TREES
Filed Nov. 30, 1923
1,537,953
3 Sheets-Sheet 3
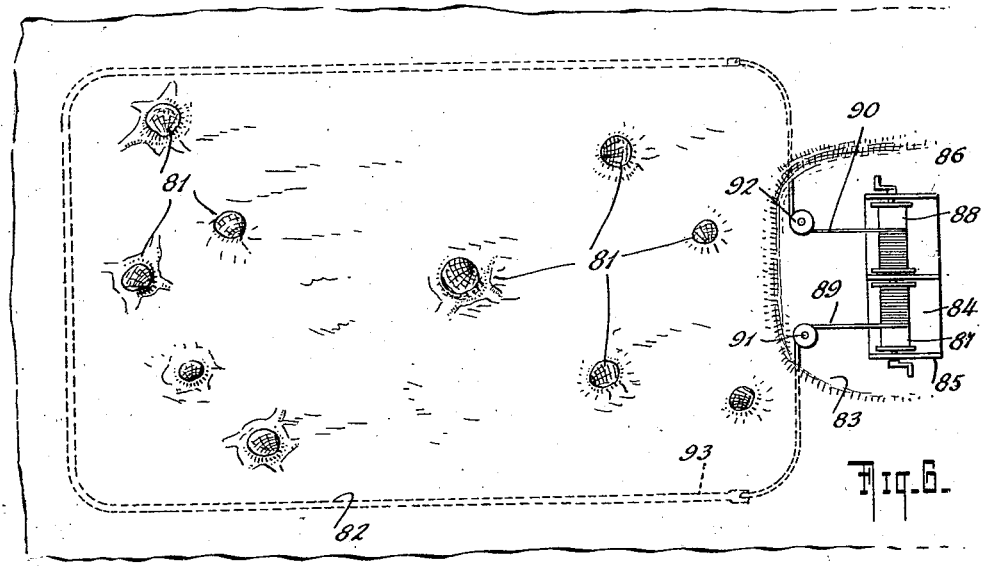
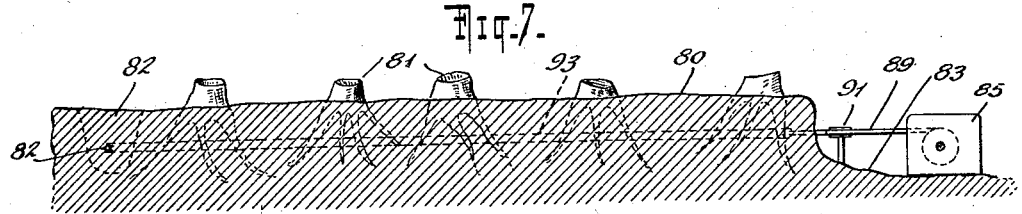
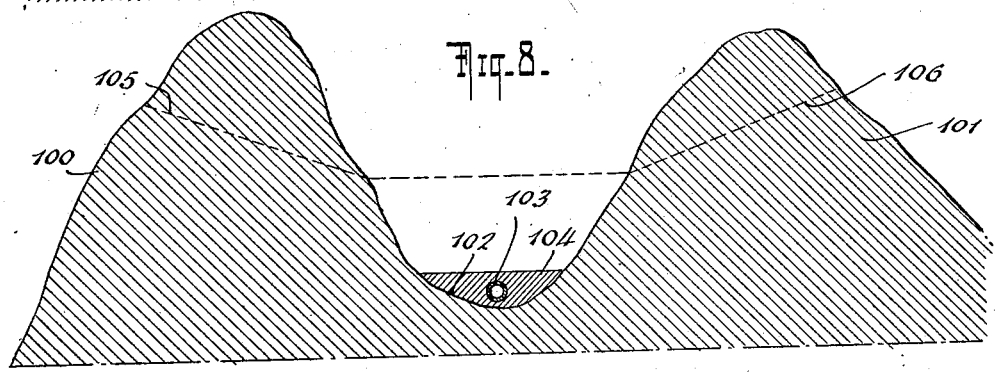
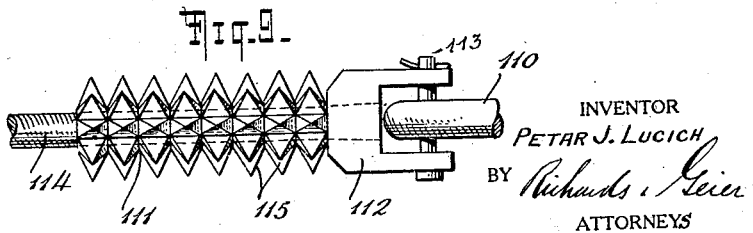
INVENTOR
PETAR J. LUCICH
BY
ATTORNEYS Patented May 19, 1925.

1,537,953

UNITED STATES PATENT OFFICE.

PETAR JOHN LUCICH, OF NEW YORK, N. Y.

CABLE SAW FOR TREES.

Application filed November 30, 1923. Serial No. 677,633.

*To all whom it may concern:*

Be it known that I, PETAR JOHN LUCICH, a subject of the Kingdom of Serbs, Croats, and Slovenes, Yugoslavia, residing at New York, county of New York, and State of New York, have invented certain new and useful Improvements in Cable Saws for Trees, of which the following is a specification.

This invention relates to improvements in means and devices for changing landscape profiles by levelling natural elevations, filling valleys, providing drainage and like operations of an extensive scope, and others of lesser magnitude, such as felling trees, even removing such portions of their stumps, as might interfere with agricultural pursuits, from below the surface of the soil and incidentally cutting the tree trunks into convenient lengths to suit the purpose for which they may be used.

The several aims and objects of the invention are to provide new and effective systems, methods and apparatus for effecting topographical changes, lumbering or deforestation and preparation of the surface for agriculture and husbandry, for encampments or preliminary to the building of towns.

In addition to these broad general purposes, many others of minor nature, but relatively important in themselves, will become manifest in the following specification in which illustrative embodiments are described and shown in the accompanying drawings, constituting a material part of this disclosure, and in which:—

Figure 1 is a general perspective view of a simple embodiment of the invention, illustrating its application to tree cutting.

Figure 2 is an enlarged fragmentary view showing the manner of operatively connecting the device to a tree trunk.

Figure 3 is a perspective view showing means for cross sawing a felled tree trunk.

Figure 4 is a view of a tree showing a preliminary cut made near its stump.

Figure 5 is a like view of the same showing a secondary, angular cut intersecting the first cut, to cause the tree to topple in a given direction.

Figure 6 is a plan view of a field or plot of land containing a plurality of tree stumps and apparatus for removing the same.

Figure 7 is a partial side elevational, partial sectional view of the same.

Figure 8 is a sectional view of land profile showing the manner of operating on the same in order to partially level the surface.

Figure 9 is a fragmentary side view of the hill cutter and driving attachment.

Figure 10 is a transverse sectional view of the same.

Referring to the drawings more in detail, Figure 1 presents graphically and generally the application of a simple form of the invention, here shown as arranged for cutting tree trunks at points remote from their stumps, the tree undergoing operation being designated by the numeral 15.

Other trees 16 and 17 are directly utilized as harness carriers, while still others 18 and 19, and a stump 20 are adjunctively employed.

The apparatus for communicating motion to the cutter and for stressing the harness cables is generally designated by the numeral 21 and is here indicated diagrammatically, rather than specifically, the embodiment being of very simple character.

This apparatus comprises a base 22 having raised side elements 23 and 30 and a corresponding central element 25. Rotatably mounted in the elements 23 and 25 is a drum 26, provided with rotative means as indicated by the handle 27.

A similar drum 28 is mounted in the elements 30 and 25, having operating means 29 and rearward of the drum 28 is another drum 24.

At the opposite side, rearward of the drum 26 are two drums 31 and 32, each being provided with individual operating means, such means being understood to be motor or hand driven as preferred.

The tree 16 is provided with a guy rope 33 and the trunk 17 with a like rope 34, both ropes being secured to the upper portion of the tree trunks and extended down to a rigid fastening means, as the stump 20; the trees are connected by a cable 35 tending to steady and measurably support the same.

Attached to the upper parts of the trees 16 and 17 and also at points near their stumps, are harnesses including substantially vertical members 36 and 37 respectively and slidably mounted on these elements are eyes 38 and 39 carrying pulley blocks 40 and 41.

Said blocks are raised or lowered by cables 42 and 43 passing over pulley blocks 44 and 45 carried by loops 46 and 47, fixed to the trees at points as high as may be convenient, the cable 42 being engaged on the drum 32 and the corresponding cable 43 connected with the adjacent drum 31.

Passing through the block 40 is a cable 48 engaging the drum 26 at its lower end and with a saw 50 at its opposite end, said saw being stressed by the cable 49 connected to the drum 28.

The saw blade 50 is disposed substantially in a horizontal plane and in operative contact with the tree 15, against which it is drawn by a rope 51, which may be passed over a guide pulley 52 attached to any convenient anchorage as the stump shown, the other end of the cable 51 being engaged on the drum 24.

The operation of securing the harness of ropes, guys, sheaves or pulley blocks and cables is easily performed, their disposition being determined by the relative location of the trees, which obviously vary in nearly every occasion.

The cables 42 and 43 are controlled independently by the drums 32 and 31 so the height of the saw blade 50 may be adjusted as required and the thrust of the saw largely taken by the cable 51 controlled by the drum 24, these several drums requiring little or no movement when originally adjusted.

Obviously the drums 26 and 28, which actuate the cables 48 and 49 and have operative engagement with the saw blade 50, require constant forward and reverse movement in order to properly reciprocate the saw and the rotary movement of the drums must be synchronized in order to maintain the saw in a properly tensioned condition.

In effect it is found that by actuating one of the handles and letting the other rotate freely good working conditions are attained.

Figure 3 of the drawings indicates the manner of cutting the logs of fallen trees in shorter lengths, such log being designated by the numeral 60, adjacent its stump 61, there being two other stumps 62 and 63 in its vicinity.

Attached to the last named stumps is a stout cable 64, the same being under tension and having slidable upon it an eye 65 carrying a two wheeled sheave block 66 in which is threaded cables 67 and 68.

The outer ends of these cables are connected with drums (not shown) by which they are moved reciprocally and their inner, adjacent ends are engaged with the ends of a flexible cutter 68 passed around the log as shown.

The trunk 70 is shown as partially separated from its stump 71, in Figure 4 by a saw kerf or transverse cut 72, parallel with the base and extending to a point slightly past the center of the tree, said cut being made in the side of the tree from the direction in which it is desired to have it topple.

In order to further ensure that the tree falls in a given direction, a second angularly disposed kerf 73 is made, its inner lower edge intersecting the bottom of the cut 72, forming a wedge shaped block 73 and weakening the trunk so that it will readily fall, these kerfs being produced by the methods previously mentioned or suitable adaptations thereof.

Another phase of the invention is clearly illustrated in Figures 6 and 7 in which the surface of the land is designated by the numeral 80, the field or ground being newly cleared but having a plurality of stumps 81 distributed with the usual and natural irregularity, such stumps and roots obviously interfering with the necessary preparation and tillage of the soil.

In order to cut off the stumps at such distance below the level of the ground as to avoid entanglement or prevent obstacles to agricultural implements, as plows, subsoilers and the like, the ground is laid off into fields or plots, rectangular or otherwise and having curved corners as shown in Figure 6.

A trench 82 is dug to encircle the field, the ends of the trench at one point being entered into a pit or shallow excavation 83 in which is placed a sturdy apparatus of the kind indicated at 21 in Figure 1 but comprised of fewer parts.

In the present case a base 84 is provided with side elements 85 and 86 in which are mounted drums 87 and 88 over which are engaged cables 89 and 90, these cables running over guide pulleys 91 and 92 and thereafter engaging a flexible cutter 93 disposed in the trench 82.

Upon communication of rotary motion simultaneously to the drums in opposite directions the cutter element 93 will advance and cut a path for itself through the soil and, as the cutter element can be shortened at intervals, it will act to slice the turf from the subsoil, cutting and rending any objects in its way as the stumps and roots shown, so that they can be easily removed.

A still further adaptation of the sawing process is illustrated in Figure 8 which shows two hills or natural elevations 100 and 101 having between them a valley or depression 102, through which quite naturally a stream of water may flow.

In handling such land levelling situations it is advisable to provide a pipe 103 of adequate size, which after having been properly levelled, may be enveloped in cement as at 104.

Cuts are then made in the hills 100 and 101 as indicated by the broken lines 105 and 106, completely separating the upper portion of the hills, these cuts being made by devices as previously generally indicated and which will later be more specifically treated.

These cuts are directed angularly downward towards the valley and at such inclination as to cause the hill tops to slide by gravity into the valley, the area of which has been taken into careful consideration in determining the portion of the hill which will be required to fill the same.

Such works of magnitude are of course accomplished under the supervision of a competent civil engineer and in fact use has been made of this disclosure for such purposes.

The cutters used throughout the several applications herein shown and described are illustrated in detail in Figures 9 and 10 but will vary in size and proportions in accordance with the work expected to be performed by them.

In general the cable 110 represents those designated heretofore by the numerals 48, 49, 67, 68, 89, 90, and the cutter 111 as being the equivalent of those designated by the numerals 50, 68 and 93.

The detail Figure 9 shows the cable 110 to be engaged to a head 112 by means of a removable pin 113 held in the outer forked end of the head, in the solid end of which is rigidly fixed one end of a flexible rod 114, the other end of the rod being engaged in like manner to the complementary cable.

Strung on the rod 114 are a plurality of cutters 115 arranged in juxtaposition and independently rotatable. Each cutter consists of a hub portion 116 from which radiate a generally star shaped figure composed of a plurality of angularly or pyramidal shaped elements 117 converging to sharp points 118, each element 117 having sharp edges presenting cutting facets, understood to be both tough and hard, and capable by longitudinal movement of the rod 114, imparted by the cables, to cut through wood, soil or rock formation in a highly effective manner.

Although the foregoing presents several embodiments of the invention, and illustrates their practical application, it will be readily understood that other modifications may be made from the disclosure and which are all within the scope of the appended claims, such minor changes not involving inventive genius but rather the skill of an artizan experienced in and familiar with the lines of work herein indicated.

Having thus described my invention, what I claim as new and desire to secure by Letters Patent, is:—

1. In a cutting apparatus, harnesses engageable with supports and each including a vertical guide member secured at opposite ends to its support, a pulley block movable longitudinally of each guide member, flexible elements connected to said pulley blocks for raising and lowering the same along said guide members, other flexible elements passing around said pulley blocks, a flexible cutter connecting adjacent ends of said other flexible elements and capable of engagement with an object to be cut, and means for actuating said other flexible elements to reciprocate said cutter.

2. In a cutting apparatus, harnesses engageable with supports and each including a vertical guide member secured at opposite ends to its support, a pulley block movable longitudinally of each guide member, flexible elements connected to said pulley blocks for raising and lowering the same along said guide members, other flexible elements passing around said pulley blocks, a flexible cutter connecting adjacent ends of said other flexible elements and capable of engagement with an object to be cut, and drums to which the various flexible elements are connected for actuating the flexible elements joined to said pulley blocks and for reciprocating said cutter.

In testimony whereof I have affixed my signature.

PETAR JOHN LUCICH.